Patented July 23, 1935

2,008,720

UNITED STATES PATENT OFFICE 2,008,720

LEVULINIC ACID ESTER

Walter E. Lawson and Paul L. Salzberg, Wilmington, Del., assignors to E. I. du Pont de Nemours & Company, Wilmington, Del., a corporation of Delaware No Drawing. Application May 3, 1932,
Serial No. 609,029

9 Claims. (Cl. 260—106)

This invention relates to new esters, their method of preparation, and more particularly, the invention relates to high boiling point levulinic esters of monohydric alcohols.

Heretofore, a few isolated levulinic esters of the lower aliphatic alcohols were known but had not been of any practical use.

An object of the present invention is the preparation of high boiling point levulinic esters of monohydric alcohols and the provision of new plasticizers for cellulose derivatives having great compatibility with the cellulose derivatives, together with extremely low vapor pressures and water insolubility. Other objects of the invention will be apparent from the description given hereinafter.

The above objects are accomplished according to the present invention by reacting levulinic acid with a monohydric alcohol adapted to give a corresponding levulinic ester having a boiling point in excess of 225° C. at 760 mm. pressure, isolating the ester, and formulating it in cellulose derivative compositions.

The reaction of the levulinic acid with the monohydric alcohol may be carried out at a temperature sufficiently high so that the water formed in the reaction is removed substantially as it is formed, and/or by employing a catalyst, and/or a solvent such as benzene or toluene to aid in the removal of the water. An inert gas such as carbon dioxide may also be passed through the reaction mixture to aid in the removal of the water. It is preferred to keep the temperature between 80-250° C., depending to some extent on the boiling point of the alcohol being used. As suitable catalysts may be mentioned hydrochloric acid, sulphuric acid, aryl-sulphonic acids, such as p-toluene-sulphonic acid, alcoholates such as sodium alcoholate, and zinc chloride.

The following examples are given to illustrate the preparation of esters according to the present invention:—

*Example 1—Lauryl levulinate.*—A mixture of 49.6 grams of lauryl alcohol and 31.0 grams of levulinic acid was heated at 170-200° C. for six hours under an air condenser which allowed the water vapor to escape but condensed the other materials. The resulting product was distilled in vacuo, 59 grams distilling between 175-190° C. at 5 mm. pressure.

*Example 2—Stearyl levulinate.*—A mixture of 50 grams stearyl alcohol and 21.5 grams of levulinic acid was heated at 190-200° C. for about eight hours under an air condenser which allowed water vapor to escape but condensed other materials. The product was then vacuum distilled, 53.5 grams of stearyl levulinate distilling between 180-200° C. at 1.5 mm. pressure.

*Example 3—Benzyl levulinate.*—A mixture of 54 grams of benzyl alcohol, 58 grams of levulinic acid and 4 drops of concentrated hydrochloric acid was heated at 160-170° C. for 14 hours under an air condenser which allowed the water vapor to escape but condensed the other materials. The product was then vacuum distilled, the benzyl levulinate distilling between 160-170° C. at 8 mm. pressure.

The above examples merely illustrate specific methods of preparing specific esters of the general class of esters coming within the scope of this invention. The proportion of levulinic acid to alcohol may, of course, be varied widely, although it is preferred to employ an excess of the levulinic acid above stoichometric proportions.

The present invention is broadly applicable to the preparation of levulinic acid esters of monohydric alcohols adapted to give esters having boiling points in excess of 225° C. Among the alcohols suitable for this purpose may be mentioned, as well as those given in the specific examples, the aliphatic alcohols having from 7-18 carbon atoms, inclusive, such as heptyl, octyl, nonyl, decyl, ceryl, myricyl, et cetera, and other alcohols such as cyclohexanol, phenylethanol, cetyl alcohol, ethylene chlorhydrin, ethyl lactate, phenols, ketobutanol, oleyl-stearyl alcohol mixture, butanolamine, geraniol, carnaubyl, melissyl, undecylenyl, oleyl, erucyl, propargyl, heptadienyl, butadienyl, exylenyl, methylcyclohexyl, dimethylcyclohexyl, decahydronaphthyl, fenchyl alcohols, citronellol, linalool, terpineol, menthol, borneol, and isoborneol.

All of these esters are either water white liquids having boiling points above 225° C. at 760 mm., or white crystalline solids also having boiling points above 225° C. at 760 mm. when pure. They are immiscible or insoluble in water and are readily soluble in the ordinary solvents such as alcohols, ketones and esters. They have extremely low vapor pressures and are compatible in equal proportions with cellulose nitrate and in equal or lower proportions with other cellulose esters and ethers, such as cellulose acetate, crotyl cellulose, benzyl cellulose, ethyl cellulose, cellulose propionate, and the like. The levulinic esters of the present invention are particularly advantageous for use with cellulose acetate, since the ketone group of the levulinic acid enhances the solubilizing action on this derivative and these particular esters are compatible in high amounts. However, it will be seen from the discussion of the properties of this class of esters that they are all highly suitable for use as plasticizers in all types of cellulose derivative compositions, cellulose derivative compositions containing the esters as plasticizers giving films which are tough and flexible and retain their flexibility substantially indefinitely due to the very low vapor pressures of the esters. Due to the water insolubility of the esters, the water resistance of the films is also improved.

Coating compositions prepared using the esters of the present invention give tough, flexible films of good water resistance. In cellulose derivative compositions comprising the plasticizers of the present invention other materials may be used such as damar, ester gum, polyhydric alcohol-polybasic acid resins, etc., pigments, fillers, and plasticizers known to the art.

The esters of the present invention may be used in the preparation of all types of cellulose derivative compositions; in particular they may be used in the preparation of lacquers for coating metal and wood, dopes for coating fabrics, and the like, and in plastic compositions to be used in the preparation of toilet ware, novelties, sheeting, rods, tubes, et cetera. These esters are also extremely valuable for use as plasticizers in blasting powders, and the like.

Among the advantages of the present invention are that it furnishes water resistant plasticizers for cellulose derivatives. Another advantage is that they are much more compatible with cellulose acetate than ordinary plasticizers and, due to their low vapor pressure, they give products which are substantially permanently flexible and have excellent durability.

As many apparently widely different embodiments of this invention may be made without departing from the spirit and scope thereof, it is to be understood that the invention is not limited to the specific embodiments thereof except as defined in the appended claims.

We claim:

1. Process comprising heating levulinic acid and a monohydric open chain aliphatic alcohol having from 7 to 18 carbon atoms, inclusive, to reaction temperature, and removing the water formed by said reaction from the reaction zone at substantially the rate it is formed.

2. Process of claim 1 wherein the alcohol is lauryl alcohol.

3. Process of claim 1 wherein the alcohol is stearyl alcohol.

4. Process comprising reacting levulinic acid and a monohydric open chain aliphatic alcohol having from 7 to 18 carbon atoms, inclusive, pressure, at 80–250° C., and removing the water formed by said reaction from the reaction zone at substantially the rate it is formed.

5. Process comprising reacting levulinic acid and a monohydric open chain aliphatic alcohol having from 7 to 18 carbon atoms, inclusive, at 80–250° C. in the presence of a catalyst, and removing the water formed by said reaction from the reaction zone at substantially the rate it is formed.

6. Process comprising reacting levulinic acid and a monohydric open chain aliphatic alcohol having from 7 to 18 carbon atoms, inclusive, at 80–250° C. in the presence of a relatively volatile solvent for the reaction mixture, and removing the water formed by said reaction from the reaction zone at substantially the rate it is formed.

7. As a new compound, a levulinic ester of a monohydric open chain aliphatic alcohol having from 7–18 carbon atoms, inclusive.

8. As a new compound, lauryl levulinate.

9. As a new compound, stearyl levulinate.

WALTER E. LAWSON.
PAUL L. SALZBERG.

CERTIFICATE OF CORRECTION.

Patent No. 2,008,720.

July 23, 1935.

WALTER E. LAWSON, ET AL.

It is hereby certified that error appears in the printed specification of the above numbered patent requiring correction as follows: Page 2, second column, line 16-17, claim 4, strike out the word and comma "pressure,"; and that the said Letters Patent should be read with this correction therein that the same may conform to the record of the case in the Patent Office.

Signed and sealed this 17th day of September, A. D. 1935.

Leslie Frazer (Seal)

Acting Commissioner of Patents.